US008525832B2

(12) United States Patent
Whitaker et al.

(10) Patent No.: US 8,525,832 B2
(45) Date of Patent: Sep. 3, 2013

(54) MESH FORMATION FOR MULTI-ELEMENT VOLUMES (75) Inventors: Ross T. Whitaker, Salt Lake City, UT (US); Miriah Meyer, Salt Lake City, UT (US); Robert M. Kirby, II, Salt Lake City, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 203 days.

(21) Appl. No.: 13/123,347

(22) PCT Filed: Oct. 8, 2009

(86) PCT No.: PCT/US2009/060022
§ 371 (c)(1),
(2), (4) Date: Aug. 24, 2011

(87) PCT Pub. No.: WO2010/042731
PCT Pub. Date: Apr. 15, 2010

(65) Prior Publication Data
US 2011/0298802 A1    Dec. 8, 2011

Related U.S. Application Data (60) Provisional application No. 61/104,519, filed on Oct. 10, 2008.

(51) Int. Cl.
G06T 15/30 (2011.01)
G06T 17/00 (2006.01)
(52) U.S. Cl.
USPC ............................... 345/423; 345/420
(58) Field of Classification Search
USPC ............................................ 345/423
See application file for complete search history.

(56) References Cited

U.S. PATENT DOCUMENTS

| 7,589,720 | B2 * | 9/2009 | Zhou et al. ............ 345/423 |
| 2007/0167760 | A1 | 7/2007 | Kim et al. |
| 2008/0030497 | A1 | 2/2008 | Hu et al. |
| 2010/0054579 | A1 | 3/2010 | Okutomi et al. |

OTHER PUBLICATIONS

Brock, K. K., et al. "Accuracy of finite element model-based multi-organ deformable image registration." Medical physics 32 (2005): 1647.*
Yin, H. M., et al. "ImageParser: a tool for finite element generation from three-dimensional medical images." BioMedical Engineering OnLine 3.1 (2004): 31.*
International Search Report and Written Opinion received in PCT/US2009/060022, Apr. 30, 2010.

* cited by examiner

*Primary Examiner* — Kee M Tung
*Assistant Examiner* — Richard M Russell
(74) *Attorney, Agent, or Firm* — Bell & Manning, LLC (57) ABSTRACT

A method of forming mesh data for three-dimensional (3-D) data is provided. Inside/outside (IO) functions are generated based on indicator functions to identify element interfaces between a plurality of elements identified in the 3-D data. An indicator function is defined to represent a volume identified for an element within the 3-D data. A cell indicator function is defined for each element interface based on the IO functions to identify a plurality of types of element interfaces. The cell indicator function identifies points in the 3-D data where a plurality of the generated IO functions evaluate to approximately zero. The types of element interfaces are identified based on a number of elements that coincide at a point in the 3-D data. 3-D point locations are distributed on the identified element interfaces based on the plurality of types of element interfaces and the IO functions. Surface mesh data is generated based on the distributed 3-D point locations.

20 Claims, 7 Drawing Sheets

MESH FORMATION FOR MULTI-ELEMENT VOLUMES

CROSS-REFERENCE TO RELATED APPLICATIONS

This application is a National Stage of International Application No. PCT/US2009/060022, filed Oct. 8, 2009, the contents of which are herein incorporated by reference. PCT/US2009/060022 claims priority to U.S. Provisional Patent Application Ser. No. 61/104,519, filed on Oct. 10, 2008, and titled "MESH FORMATION FOR MULTI-ELEMENT VOLUMES," the disclosure of which is incorporated herein by reference in its entirety.

REFERENCE TO GOVERNMENT RIGHTS

This invention was made with government support under CCR0310705, CNS0551724, P41 RR012553 and W911NF-05-1-0395 awarded by National Science Foundation, National Institutes of Health and U.S. Army Research Laboratory. The government has certain rights in this invention.

BACKGROUND

Three-dimensional (3-D) data provides an important source of information for generating realistic computer models of real-world objects. For example, biological and geophysical data is often captured using volumetric scanning methods such as magnetic resonance imaging (MRI) or ultrasound. The data from these devices is usually stored as a regular grid of values that provide information about the surface of the scanned object and its detailed internal structure. Most objects, natural or man-made, contain multiple elements, possibly formed of different elements, with vastly different physical properties that are typically organized in complicated geometric configurations. Extracting precise geometric models of the interfaces between these elements is important both for visualization and for realistic physically-based simulations in a variety of fields, from biomedical computing and computer animation to oil-and-gas exploration and engineering.

Multi-element volumes impose particular challenges for sampling and meshing algorithms because the boundaries between elements are typically not smooth manifolds. As a result, intersections of elements can produce sharp features such as edges and corners. Furthermore, the development of increasingly realistic simulations dictates additional constraints, such as a sufficient number of samples to accurately represent the geometry, compact sets of nearly regular triangles, and consistent tessellations across element boundaries.

The problem of body fitting meshes that are both adaptive and geometrically accurate is important in a variety of biomedical applications in a multitude of clinical settings, including electrocardiology, neurology, and orthopedics. Adaptivity is necessary because of the combination of large-scale and smallscale structures (e.g. relatively small blood vessels spanning a human head). Geometric accuracy is important for several reasons. In some cases, such as computational fluid dynamics, the fine-scale structure of the fluid domain is important for qualitative and quantitative accuracy of the solutions. More generally, finite element approximations of elliptic problems with rough coefficients require increased spatial resolution normal to element boundaries. The problem of constructing meshes from biomedical 3-Ds is particularly difficult because of the complexity and irregularity of the structures, and thus tuning or correcting meshes by hand is quite difficult and time consuming. Many researchers and commercial products simply subdivide the underlying hexahedral 3-D grid and assign element properties to tetrahedral based on standard decomposition of each hexahedron into tetrahedral which fails to provide the needed adaptivity and geometric accuracy.

SUMMARY

In an exemplary embodiment, a method of forming mesh data for three-dimensional data is provided. Inside/outside (IO) functions are generated based on indicator functions to identify element interfaces between a plurality of elements identified in the 3-D data. An indicator function is defined to represent a volume identified for an element within the 3-D data. A cell indicator function is defined for each element interface based on the IO functions to identify a plurality of types of element interfaces. The cell indicator function identifies points in the 3-D data where a plurality of the generated IO functions evaluate to approximately zero. The types of element interfaces are identified based on a number of elements that coincide at a point in the 3-D data. 3-D point locations are distributed on the identified element interfaces based on the plurality of types of element interfaces and the IO functions. Surface mesh data is generated based on the distributed 3-D point locations.

In another exemplary embodiment, a system for forming mesh data from three-dimensional data is provided. The system includes, but is not limited to, a processor and a computer-readable medium including computer-readable instructions stored therein wherein, when executed by the processor, the computer-readable instructions cause the device to perform the operations of the method.

In yet another exemplary embodiment, a computer-readable medium is provided. The computer-readable medium includes computer-readable instructions stored therein wherein, when executed by a processor, the computer-readable instructions cause a computing device to perform the operations of the method.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements.

DETAILED DESCRIPTION

Figure 1:
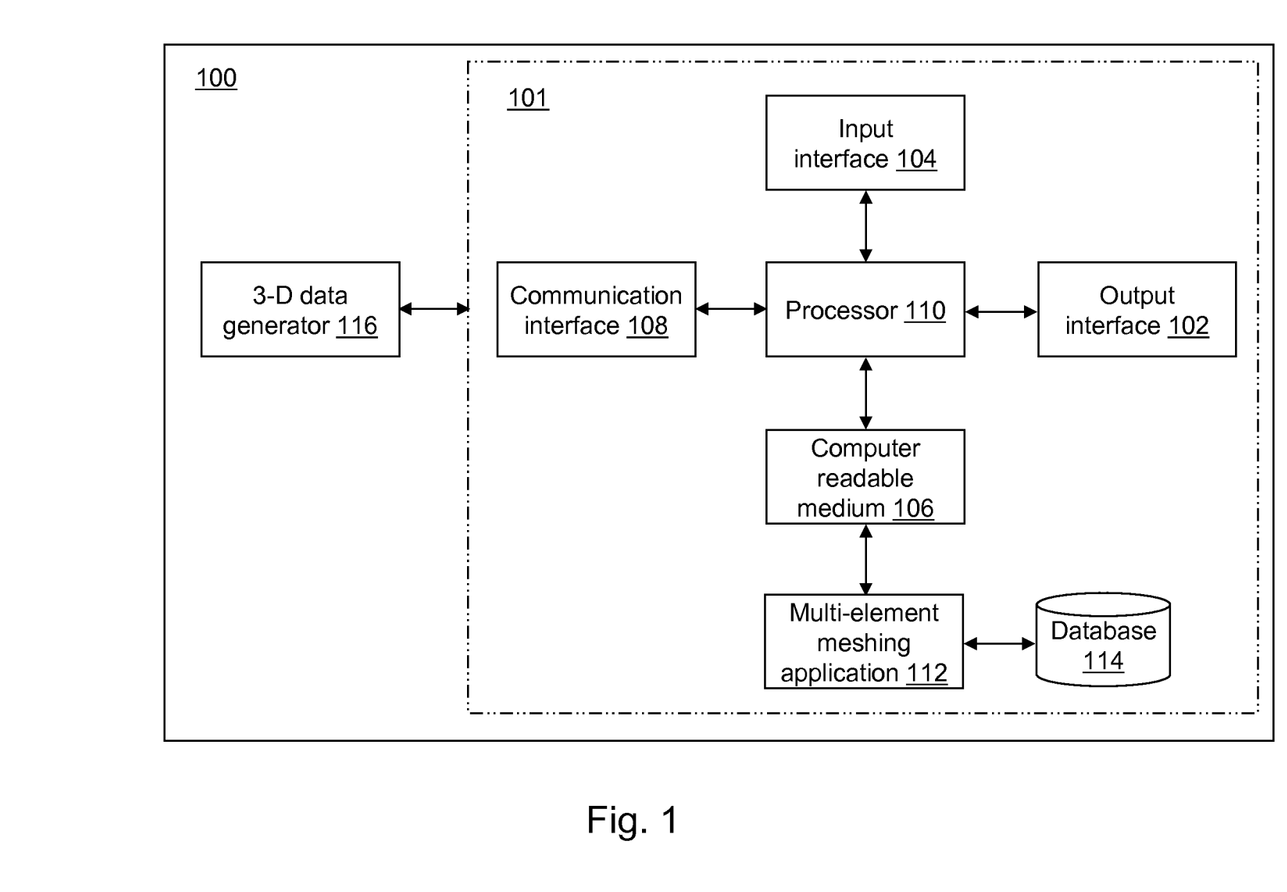
FIG. 1 depicts a block diagram of a 3-D mesh formation system in accordance with an exemplary embodiment.

With reference to FIG. 1, a block diagram of a 3-D mesh formation system 100 is shown in accordance with an exemplary embodiment. 3-D mesh formation system 100 may include a 3-D data generator 116 and a computing device 101. The components of 3-D mesh formation system 100 may be implemented using one or more computing devices, which may be a computer of any form factor such as a laptop, a desktop, a server, etc. Computing device 101 may include an output interface 102, an input interface 104, a computer-readable medium 106, a communication interface 108, a processor 110, a multi-element meshing application 112, and a database 114. Different and additional components may be incorporated into 3-D mesh formation system 100. In the embodiment illustrated in FIG. 1, 3-D data generator 116 generates 3-D data that may include multiple related elements formed of the same or different elements. For example, 3-D data generator 116 may be a magnetic resonance imaging machine, a computed tomography machine, an ultrasound device, a radar, etc. The 3-D data may include imaging data generated of an object examined using 3-D data generator 116. For example, an imaged object may be head of a human being such that the image includes different types of material such as grey matter, white matter, cerebrospinal fluid, skin, bone, and air. As another example, 3-D data generator 116 may be a computing device configured to generate geometric models of objects that may include multiple related elements formed of the same or different materials. For example, 3-D data generator 116 may include a software tool to generate 3-D data describing an object such as an airplane using equations that describe the surface of the multiple related elements (airplane wing) that make up the object.

Output interface 102 provides an interface for outputting information for review by a user of 3-D mesh formation system 100. For example, output interface 102 may include an interface to a display, a printer, a speaker, etc. The display may be a thin film transistor display, a light emitting diode display, a liquid crystal display, or any of a variety of different displays known to those skilled in the art. The printer may be any of a variety of printers as known to those skilled in the art. The speaker may be any of a variety of speakers as known to those skilled in the art. 3-D mesh formation system 100 may have one or more output interfaces that use the same or a different interface technology.

Input interface 104 provides an interface for receiving information from the user for entry into 3-D mesh formation system 100 as known to those skilled in the art. Input interface 104 may interface with various input technologies including, but not limited to, a keyboard, a pen and touch screen, a mouse, a track ball, a touch screen, a keypad, one or more buttons, etc. to allow the user to enter information into 3-D mesh formation system 100 or to make selections presented in a user interface displayed on display 102 under control of multi-element meshing application 112. Input interface 104 may provide both an input and an output interface. For example, a touch screen both allows user input and presents output to the user. 3-D mesh formation system 100 may have one or more input interfaces that use the same or a different interface technology.

Computer-readable medium 106 is an electronic holding place or storage for information so that the information can be accessed by processor 110 as known to those skilled in the art. Computer-readable medium 106 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, etc. 3-D mesh formation system 100 may have one or more computer-readable media that use the same or a different memory media technology. 3-D mesh formation system 100 also may have one or more drives that support the loading of a memory media such as a CD, a DVD, a flash memory card, etc.

Communication interface 108 provides an interface for receiving and transmitting data between devices using various protocols, transmission technologies, and media as known to those skilled in the art. The communication interface may support communication using various transmission media that may be wired or wireless. 3-D mesh formation system 100 may have one or more communication interfaces that use the same or different protocols, transmission technologies, and media.

One or more of the components of 3-D mesh formation system 100 may interact through communication interface 108 using a network such as a local area network (LAN), a wide area network (WAN), a cellular network, the Internet, etc. Thus, the components of 3-D mesh formation system 100 may be implemented at a single computing device or a plurality of computing devices in a single location, in a single facility, and/or may be remote from one another. For example, communication interface 108 may support communication between multi-element meshing application 112 and 3-D data generator 116 which may include a second communication interface. Additionally, multi-element meshing application 112 may include a plurality of modules that communicate using communication interface 108.

Thus, 3-D data generator 116 and computing device 101 may be integrated into a single system. Alternatively, 3-D data generator 116 and computing device 101 may be connected directly. For example, 3-D data generator 116 may connect to computing device 101 using a cable for transmitting information between 3-D data generator 116 and computing device 101. As another alternative, 3-D data generator 116 may connect to computing device 101 using a network. 3-D data may be stored electronically and accessed using computing device 101. As yet another alternative, 3-D data generator 116 and computing device 101 may not be connected. Instead, the 3-D data acquired using 3-D data generator 116 may be manually provided to computing device 101. For example, the 3-D data may be stored on electronic media such as a CD, a DVD, a flash drive, etc. After receiving the 3-D data, computing device 101 may initiate processing of the 3-D data automatically or under control of an operator of computing device 101.

Processor 110 executes instructions as known to those skilled in the art. The instructions may be carried out by a special purpose computer, logic circuits, or hardware circuits. Thus, processor 110 may be implemented in hardware, firmware, software, or any combination of these methods. The term "execution" is the process of running an application or the carrying out of the operation called for by an instruction.

The instructions may be written using one or more programming language, scripting language, assembly language, etc. Processor 110 executes an instruction, meaning that it performs the operations called for by that instruction. Processor 110 operably couples with output interface 102, with input interface 104, with computer-readable medium 106, and with communication interface 108 to receive, to send, and to process information. Processor 110 may retrieve a set of instructions from a permanent memory device and copy the instructions in an executable form to a temporary memory device that is generally some form of RAM. 3-D mesh formation system 100 may include a plurality of processors that use the same or a different processing technology.

Multi-element meshing application 112 performs operations associated with constructing a mesh based on 3-D data generated by 3-D data generator 116. Some or all of the operations described may be embodied in multi-element meshing application 112. The operations may be implemented using hardware, firmware, software, or any combination of these methods. With reference to the exemplary embodiment of FIG. 1, multi-element meshing application 112 is implemented in software stored in computer-readable medium 106 and accessible by processor 110 for execution of the instructions that embody the operations of multi-element meshing application 112. Multi-element meshing application 112 may be written using one or more programming languages, assembly languages, scripting languages, etc.

Database 114 may include a structured query language (SQL) database. The database may be organized into multiple databases to improve data management and access. The multiple databases may be organized into tiers. Additionally, database 114 may comprise a file system including a plurality of data files. Thus, different storage architectures can be used for the 3-D and/or meshing data. They include files in a file system, native extensible markup language databases, relational databases, SQL databases, etc. Database 114 may further be accessed remotely using communication interface 108.

Figure 2:
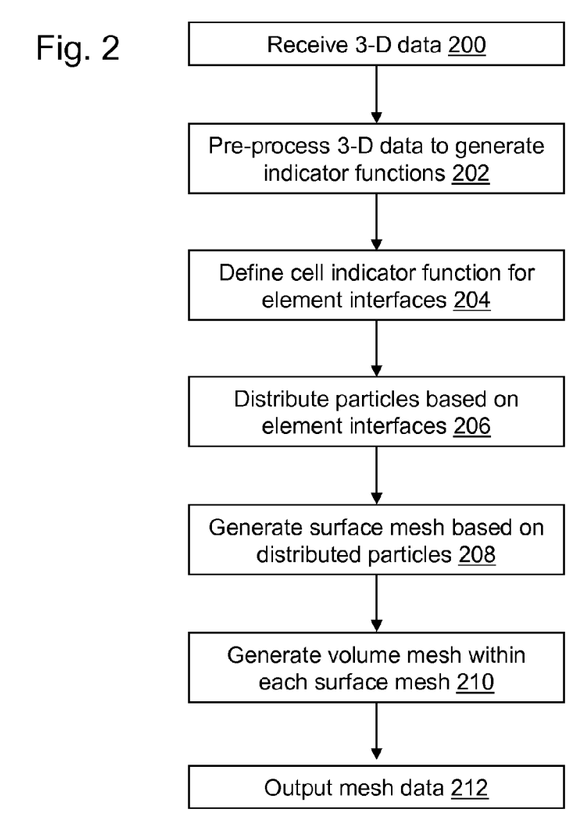
FIG. 2 depicts a flow diagram illustrating exemplary operations performed by a multi-element meshing application of the 3-D mesh formation system of FIG. 1 in accordance with an exemplary embodiment.

With reference to FIG. 2, exemplary operations associated with multi-element meshing application 112 are described. Additional, fewer, or different operations may be performed, depending on the embodiment. The order of presentation of the operations of FIG. 2 is not intended to be limiting. In an operation 200, 3-D data is received. For example, the 3-D data generated by 3-D data generator 116 may be received at computing device 101 directly or indirectly from 3-D data generator 116. In an operation 202, the received 3-D data is pre-processed to generate indicator functions that describe each element identified within the 3-D data. Pre-processing operations are described with reference to FIG. 3 in accordance with an exemplary embodiment. In an operation 204, cell indicator functions are defined for each type of element interface identified within the 3-D data. Cell indicator function definition operations are described with reference to FIG. 4 in accordance with an exemplary embodiment. In an operation 206, particles are distributed on surfaces defined by the element interfaces to determine a set of surface points. Particle distribution operations are described with reference to FIG. 5 in accordance with an exemplary embodiment. A particle is a 3-D point location identified within the 3-D volume, V, defined by the received 3-D data. In an operation 208, a surface mesh is generated based on the set of surface points defined from the distributed particles. In an operation 210, a volumetric mesh is generated within each generated surface mesh. In an operation 212, the surface and/or volumetric mesh data is output. For example, the surface and/or volumetric mesh data may be presented to a user using output interface 102, may be stored to database 114 for input to a simulation or other process, or may be communicated to another device using communication interface 108 for further analysis, presentation, etc.

Figure 3:
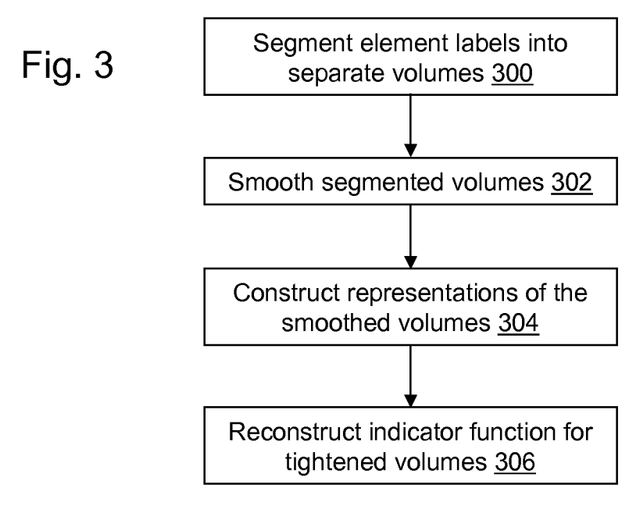
FIG. 3 depicts a flow diagram illustrating exemplary operations performed by a pre-processing module of the multi-element meshing application in accordance with an exemplary embodiment.

With reference to FIG. 3, exemplary pre-processing operations associated with multi-element meshing application 112 are described. Additional, fewer, or different operations may be performed, depending on the embodiment. The order of presentation of the operations of FIG. 3 is not intended to be limiting. Interfaces in the received 3-D data comprising multiple elements are represented using a model that describes each element with a smooth, volumetric indicator function, $f_i$. A set of N indicator functions $F=\{f_i|f_i:V \mapsto \Re\}$ represents n elements. The indicator functions $f_i$ are formed by smooth interpolations of the output of segmented volumes or label maps. In an operation 300, each element label is segmented into a separate volume. In an exemplary embodiment, the segmentations may be generated by a semi-automated tissue classification algorithm followed by a manual inspection and hand editing of mislabeled pixels in the received 3-D data. In an operation 302, each volume is smoothed to control the feature size. By smoothing the labeled data as a pre-processing operation, a domain expert can control the amount of data processing and smoothing such that the resulting meshes capture the appropriate amount of geometry for a specific application. This is contrary to the data smoothing that occurs in grid based approaches, which smooth voxelization artifacts present in the multi-element mesh as a post-processing step with a limited amount of user control.

In an operation 304, smooth, implicit representations of the smoothed volumes are constructed. For example, each label map may be processed using a level-set implementation of a grayscale morphology algorithm, which limits the radius of curvature of the resulting boundary using constrained, level set curvature flow, as discussed in a paper by Williams and Rossignac [J. Williams and J. Rossignac, *Tightening: Curvature-limiting Morphological Simplification*, Proc. of the Symp. on Solid and Physical Modeling, 107-112, (2005),], incorporated herein by reference in its entirety, and identified as the tightening radius. The grayscale morphology algorithm accepts as input an antialiased binary volume representing a single element, along with a user-defined tightening radius that specifies the desired minimum radius of curvature for the final, tightened surface. The output of the algorithm is a grayscale volume that stores the signed distance to a tightened element surface, where positive values indicate the material of the element within the volume of the element.

In an operation 306, a continuous, differentiable indicator function $f_i$ is reconstructed from the tightened volumes of each element using separable convolution, which convolves a one-dimensional, continuous kernel with grid points along each separate axis of a volume. In an exemplary embodiment, an interpolating $4^3$ Catmull-Rom spline is used as the continuous kernel though other splines may be used. The reconstructed implicit functions are defined as the set of indicator functions F.

Figure 4:
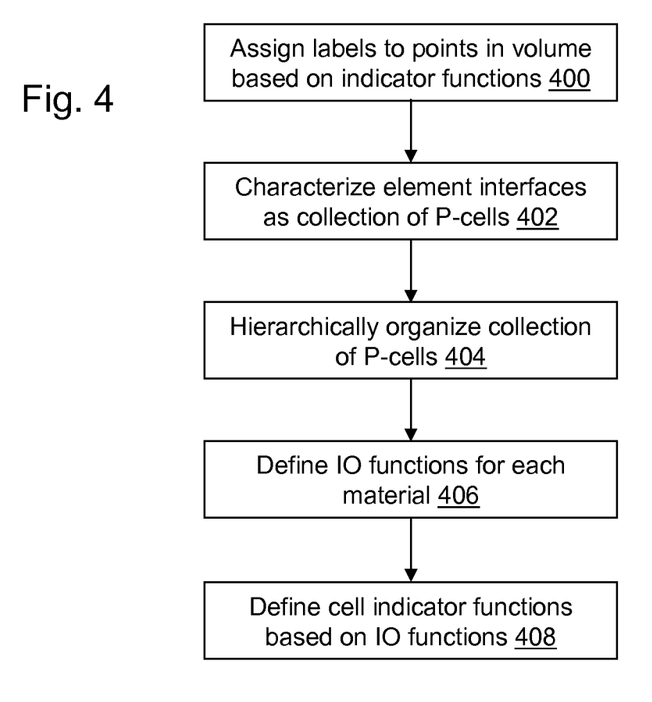
FIG. 4 depicts a flow diagram illustrating exemplary operations performed by a multi-element interface processing module of the multi-element meshing application in accordance with an exemplary embodiment.

With reference to FIG. 4, exemplary cell indicator function definition operations associated with multi-element meshing application 112 are described. Additional, fewer, or different operations may be performed, depending on the embodiment. The order of presentation of the operations of FIG. 4 is not intended to be limiting. In an operation 400, a element label i is assigned to a point x∈V if (and only if) $f_i(x)>f_j(x)$ $\forall j \neq i$ according to the indicator functions for the respective elements. If N>2, the boundaries that separate elements are not necessarily manifold and can form sharp corners and edges. In an operation 402, each element interface is characterized in terms of the number of element indicator functions f that are maximal (and equal) at that interface to define a collection of cells. Thus, the order of the interface is characterized by the number of coincident elements.

For $V \subset \Re^2$, a two element interface and a three element interface occur generically while a four element interface is a non-generic case. For $V \subset \Re^d$, each K element interface forms a subset of V that is topologically equivalent (homeomorphic) to a P-disk, where P=d−K+1. Thus, each type of element interface can be considered a P-cell, as described in a paper by Adamson and Alexa [A. Adamson and M. Alexa, *Point-Sampled Cell Complexes*, ACM Transactions on Graphics 25(3), 671-680 (2006).] incorporated herein by reference in its entirety. Generically, for d=3, interfaces of four elements are denoted as 0-cells which comprise points; interfaces of three elements are denoted as 1-cells which comprise curves; and interfaces of two elements are denoted as 2-cells which comprise surfaces. For example, in magnetic resonance imaging data of a head, there may be six different elements including grey matter, white matter, cerebrospinal fluid, skin, bone, and air. Based on inclusion of six different elements in the received 3-D data, there is a possibility of 15 different types of 2-cells, 20 different types of 1-cells, and 15 different types of 0-cells based on the number of combinations. The collection of cells that describe the different types of element interfaces, taken together, form a CW-complex as described in a paper by Kniss et al. [J. Kniss, W. Hunt, K. Potter, and P. Sen. Istar, *A Raster Representation for Scalable 3-D and Volume Data*, IEEE Trans. on Visualization and Computer Graphics 13(6), 1424-1431 (2007).] incorporated herein by reference in its entirety. In an operation 404, the collection of cells is organized hierarchically such that each 2-cell is attached to a collection of 1-cells (at its border), and each one cell is attached to one or more 0-cells.

In an operation 406, inside/outside (IO) functions are defined for each element using the organized collection of cells so that the boundaries between different elements, represented as zero sets of the IO functions, coincide. In an exemplary embodiment, the IO functions can be defined as:

$$\tilde{f}_i = f_i - \max_{j=1, j \neq i}^{n} f_j. \qquad (1)$$

where positive values indicate the presence of element i and negative values indicate some other element. The IO functions have the property that the zero-set of any one 10 function coincides with the element transitions between i and some other element. This means, for instance, that for two adjacent elements, i and j, we have $\tilde{f}_i = \tilde{f}_j = 0$ along the interface where the two elements meet.

In an operation 408, cell indicator functions that identify points in V where a set of IO functions evaluate to approximately zero (i.e., within machine precision) are defined for the different kinds of element interfaces (cells) within a multi-element volume. Along this curve, $\tilde{f}_1 = \tilde{f}_2 = 0$ and $\tilde{f}_3 < 0$, while in the vicinity of this curve $\tilde{f}_1$ and $\tilde{f}_2$ will be nonzero (one negative and the other positive). Thus, in 3-D, the set of 2-cells that form the interface between two elements i and j, where i≠j, can be represented as the zero-set of the continuous cell indicator function:

$$J_{ij} = \tilde{f}_i^2 + \tilde{f}_j^2. \qquad (2)$$

In this scheme, the 1-cells for the set of elements i, j, k (assumed distinct) are given by the set of points $J_{ijk}=0$ where:

$$J_{ijk} = \tilde{f}_i^2 + \tilde{f}_j^2 + \tilde{f}_k^2, \qquad (3)$$

and likewise, the indicator for a 0-cell is:

$$J_{ijkl} = \tilde{f}_i^2 + \tilde{f}_j^2 + \tilde{f}_k^2 + \tilde{f}_l^2. \qquad (4)$$

Thus, for a set of elements M where 2≦|M|≦4 generically in 3-D, cell indicator functions can be defined as:

$$J_m = \sum_{i \in M} \tilde{f}_i^2. \qquad (5)$$

The zero set of each cell indicator function is the cell defined by the interface of the elements M.

Figure 5:
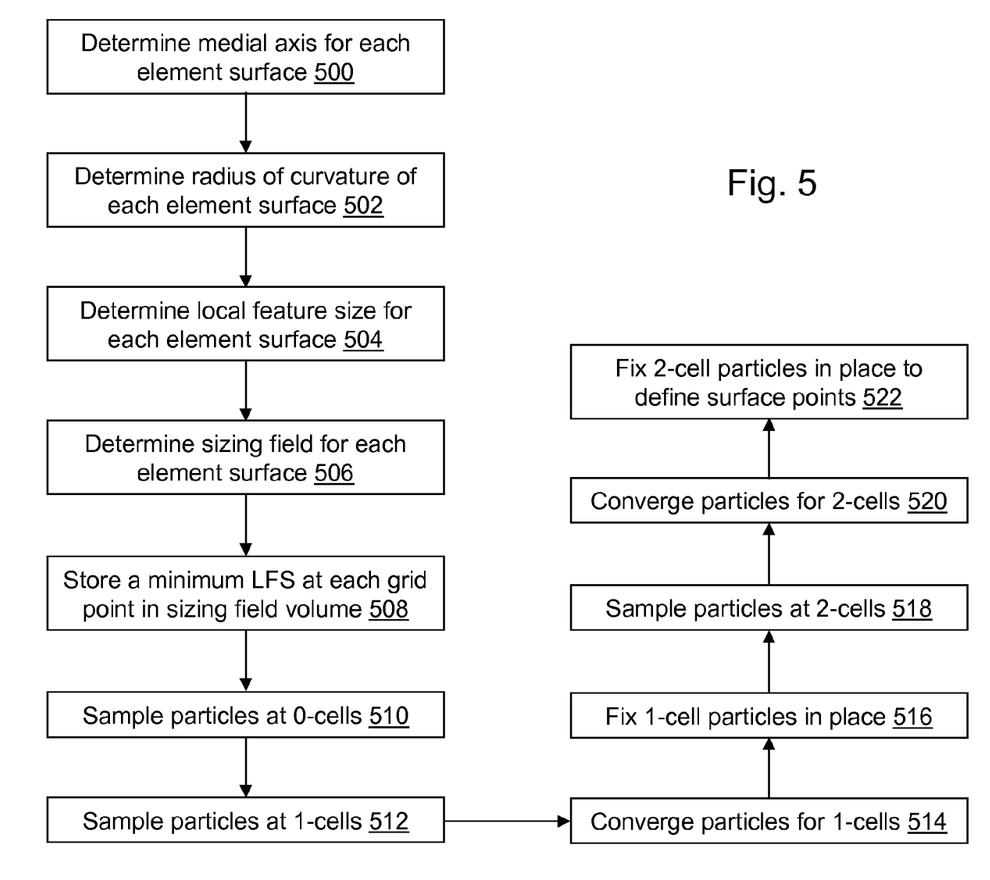
FIG. 5 depicts a flow diagram illustrating exemplary operations performed by a particle distribution determination module of the multi-element meshing application in accordance with an exemplary embodiment.

With reference to FIG. 5, exemplary particle distribution operations associated with multi-element meshing application 112 are described. Additional, fewer, or different operations may be performed, depending on the embodiment. The order of presentation of the operations of FIG. 5 is not intended to be limiting. In an operation 500, a medial axis is determined for each element surface. In an exemplary embodiment, the medial axis may be determined using a methodology as described in a paper by Meyer et al. [M. Meyer, R. M. Kirby, and R. Whitaker, *Topology, Accuracy, and Quality of Isosurface Meshes using Dynamic Particles*, IEEE Trans. on Visualization and Computer Graphics 12(5), 1704-1711, September/October 2007.], incorporated herein by reference in its entirety. In an operation 502, a radius of curvature is determined for each element surface. In an exemplary embodiment, the radius of curvature may be determined using a methodology as described in the paper by Meyer et al. In an operation 504, a local feature size (LFS), which is the distance to the nearest point on the medial axis is determined for each element surface. The determined radius of curvature and the determined medial axis are used to construct a Lipschitz continuous measure of LFS such as that described in a paper by Amenta et al. [N. Amenta, M. Bern, and D. Eppstein, *The Crust and the Beta-skeleton: Combinatorial Curve Reconstruction*, Graphic Models and 3-D Proc., 60(2), 125-135, March 1998.] incorporated herein by reference in its entirety. In an exemplary embodiment, the LFS governs a minimal sampling rate of a element surface. In an operation 506, a sizing field, used to define how far particles should be from their neighbors, is determined for each element surface. In an exemplary embodiment, the sizing field is proportional to the determined LFS and may be determined using a methodology as described in the paper by Meyer et al.

In an operation 508, a minimum LFS is stored at each grid point in the sizing field volume for the set evaluated at the grid point location. The minimum LFS may be smoothed using a gradient-limiting, partial differential equation as proposed in a paper by Persson [P. O. Persson, *Mesh Size Functions for Implicit Geometries and PDE-based Gradient Limiting, Eng'g. with Computers* 22(2), 95-109 (2006).] incorporated herein by reference in its entirety. Along sharp features, however, the LFS goes to zero, causing an infinite sampling requirement. Because sharp features in the data are explicitly sampled, the strict LFS requirements near 0-cells and 1-cells can be violated, and thus, a lower bound is placed on the sizing field. The lower bound is determined by the tightening radius that drives the tightening algorithm when smoothing the element volumes.

A hierarchy of particle systems samples each type of generically occurring element interface such that each element interface is represented in the final mesh. Thus, in an operation 510, the 0-cells (points) are sampled with a single particle, which remains fixed in place. The particle systems position samples with inter-point distances that respect the LFS along each element interface. In an operation 512, the 1-cells are sampled with particle systems that interact with the 0-cell particles. In an operation 514, the 1-cell particles are converged to a steady state. An iterative algorithm is executed that relaxes the particle positions to minimize an energy function that favors equal distributions of points or particles. In an exemplary embodiment, an iterative algorithm as described in the paper by Meyer et al. may be used.

Thus, at each iteration, the entire list of particles is processed and their positions are modified so that each particle moves according to a repulsive force that depends on the distance to all other particles within a specified radius. Nearby particles are determined efficiently by their location in a hierarchical, space partitioning data structure, such as an octtree. The degree of the force is modified according to the sizing field and particles are added or deleted from the list so that each particle maintains an average distance from particles nearby. Particles are constrained to lie on a surface or manifold by (i) projecting the force onto the tangent space of that manifold before updating the particle and (ii) reprojecting the particle onto the manifold after each update.

The positions of the particles are updated along a gradient of an objective function that prefers regular configurations. Each particle is constrained to a particular element interface. Each type of cell includes a set of projection operators that force particle motions to remain in the tangent space of the associated element boundary. Thus, to distribute a set of particles across a surface, the particles are projected onto the surface and constrained to move along the surface. In an exemplary embodiment, particles are projected onto the surface using a gradient descent method such as Newton-Raphson. In an exemplary embodiment, particles are constrained to move along the surface by projecting motion vectors onto a local tangent space of the surface. For distributing particles across multi-element interfaces, both require first derivative information of the cell indicator functions. Thus, the gradient of Equation 2 (with analogous definitions for Equations 3 and 4) is:

$$\nabla J_{ij} = 2\tilde{f}_i \nabla \tilde{f}_i + 2\tilde{f}_j \nabla \tilde{f}_j. \quad (6)$$

The maximum function is only $C^0$, however, and the derivative is not defined at the transition between elements. The maximum, however, can be approximated with a smooth function that is differentiable, interpolates the max(i, j) at i=j, and can be tuned (via a parameter) to be arbitrarily close to the maximum. An analytic, differentiable approximation to max for a set of m values $v_i \in V$ that interpolates the max(i, j) at i=j can be determined by first defining a function g:

$$g(v) = 1 + \frac{v}{(v^2 + \varepsilon_{max}^2)^{1/2}}. \quad (7)$$

The max function is then:

$$\max(V) = \frac{1}{2^{m-1}} \sum_{i=1}^{m} v_i \prod_{j=1, j \neq i}^{m} g(v_i - v_j) \quad (8)$$

with the gradient given by:

$$\nabla \max(V) = \frac{1}{2^{m-1}} \sum_{i=1}^{m} \left[ \nabla v_i \prod_{j=1, j \neq i}^{m} g(v_i - v_j) + v_i \left( \sum_{j=1, j \neq i}^{m} \nabla g(v_i - v_j) \prod_{j=1, j \neq i}^{m} g(v_i - v_j) \right) \right] \quad (9)$$

where:

$$\nabla g(V) = \nabla v \left[ \frac{1}{(v^2 + \varepsilon_{max}^2)^{1/2}} - \frac{v^2}{(v^2 + \varepsilon_{max}^2)^{3/2}} \right]. \quad (10)$$

Using this approximation, it can be shown through a Taylor series expansion around points on element interfaces that zero-set surfaces exist for the cell indicator functions to within machine precision.

The cell indicator functions have the property that they are zero on the set of interest (i.e., a element interface) and positive everywhere else. Because the set of interest is locally minimal, the gradient is zero on the element interfaces, and thus the cell indicator functions, unlike the IO functions, do not directly provide the tangent spaces that are needed to constrain the motion of interacting particles. The cell indicator functions are constructed, however, from combinations of implicit functions for the individual elements (i.e., the IO functions), and the gradients of these IO functions give the local orientation of the cells. Thus, a series of projection operators that rely on gradients of the IO functions to reconstruct the tangent spaces (planes or lines in 3-D) of the corresponding cells can be used.

For 2-cells, the gradients of the IO functions that characterize the interface will be approximately equal and opposite near the zero set, thus a motion vector of a particle, v, is projected onto a tangent plane that is defined by the average (for numerical robustness) of the IO function gradients:

$$n_t = \frac{\nabla \tilde{f}_i - \nabla \tilde{f}_j}{|\nabla \tilde{f}_i - \nabla \tilde{f}_j|}. \quad (11)$$

The motion vector is updated as:

$$v \leftarrow v - \langle v, n_t \rangle n_t = (I - n_t \otimes n_t) v. \quad (12)$$

On the 1-cells, particles must move along the tangent line of the zero set of $J_{ijk}$. A tangent line is computed as the summation of the cross products of each pair of the three characterizing IO function normals, which all have zero-crossings along that set:

$$t_{ijk} = \frac{\nabla \tilde{f}_i}{|\nabla \tilde{f}_i|} \times \frac{\nabla \tilde{f}_j}{|\nabla \tilde{f}_j|} + \frac{\nabla \tilde{f}_j}{|\nabla \tilde{f}_j|} \times \frac{\nabla \tilde{f}_k}{|\nabla \tilde{f}_k|} + \frac{\nabla \tilde{f}_k}{|\nabla \tilde{f}_k|} \times \frac{\nabla \tilde{f}_i}{|\nabla \tilde{f}_i|} \quad (13)$$

The particle motion vectors are projected onto the normalized tangent line, constraining the motions to the 1-cell based on:

$$v \leftarrow \left\langle \frac{t_{ijk}}{|t_{ijk}|}, v \right\rangle \frac{t_{ijk}}{|t_{ijk}|}. \quad (14)$$

In an operation 516, the 1-cell particles are fixed in place. In an operation 518, the 2-cells are sampled with particle systems that interact with the 0-cell and the 1-cell particles. In an operation 520, the 2-cell particles are converged to a steady state. In an operation 522, the 2-cell particles are fixed in place. The particles define surface points for each element surface.

From the surface points, a Delaunay-based meshing scheme may be used to create surface meshes that are suited for the generation of well-shaped volumetric elements. The sizes of triangles on the surface meshes are proportional to the sizes of the tetrahedra needed to fill the adjacent volumes. The datasets include a element label for almost every point in V which allows for a simple labeling algorithm to reliably extract the element surfaces, as well as the element interfaces. The labeling algorithm determines a Delaunay tetrahedralization of the sets of surface points sampling the 0-cells, 1-cells, and 2-cells. Each tetrahedral element is labeled according to the element type in which its circumscribing sphere center lies. A surface mesh is generated by extracting all faces bounded by the tetrahedra with different element labels. In an exemplary embodiment, the tetrahedral surface mesh may be generated using the open-source software package TetGen, developed by the Weierstrass Institute for Applied Analysis and Stochastics, to generate a tetrahedralization of the convex hull of the set of particles. The watertight, non-manifold mesh of the element interfaces is the subset of faces that are bounded by tetrahedra of different element types. Faces that lie on the convex hull are labeled as having a second bounding tetrahedra of the outside element type. The non-manifold mesh can be used to generate volume filling elements that conform to the LFS of the boundary. Manifold meshes of each individual element can also be extracted in a similar fashion, with the shared boundaries of surface meshes having consistent triangulations by construction. Other Delaunay-based surface reconstruction algorithms, such as TightCocone discussed in a paper by Dey et al. [T. K. Dey and S. Goswami. Tight Cocone: A water-tight surface reconstructor, Journal of Computing and Information Science in Engineering 3(4), 302-307, December 2003.], incorporated herein by reference in its entirety, may be used to infer topology from an organized set of points without knowledge of the underlying surface/solid.

The particle system framework can be utilized for packing spheres inside of sampled multi-element interfaces. The spheres may be distributed using the same sizing field that guides the surface sampling and may be smoothed away from the surface such that larger values are on the inside of the elements. The volume samples can be used to generate tetrahedral meshes that conform to the element interfaces and that respect the LFS of the boundaries. For example, the tetrahedral volumetric meshing process described in a paper by Alliez et al. [P. Alliez, D. Cohen-Steiner, M. Yvinec, and M. Desbrun, *Variational Tetrahedral Meshing*, ACM Transactions on Graphics 24(3), 617-625 (2005).] incorporated herein by reference in its entirety, may be used to determine the volumetric mesh bounded by each element surface. As another example, the tetrahedral volumetric meshing process may be performed using TetGen. TetGen may be used in a constrained-Delaunay mode so points are added to the volume interior, but not to the surface. The Delaunay tetrahedralization may use the constrained Delaunay tetrahedralization method proposed in a paper by Si and Gaertner [H. Si and K. Gaertner, *Meshing Piecewise Linear Complexes by Constrained Delaunay Tetrahedralizations*, Proc. 14th Intl Meshing Roundtable, 147-163 (2005).] incorporated herein by reference in its entirety. The TetGen software includes a Delauney refinement approach as described in a paper by Shewchuk [J. Shewchuk, Tetrahedral Mesh Generation by Delaunay Refinement, Proc. 14th Ann. ACM Symp. on Computational Geometry, 86-95 (1998).], incorporated herein by reference in its entirety, to ensure mesh quality, as measured by edge-radius ratios. In an exemplary embodiment, a sliver removal process may be performed such as that provided by the TetGen software to reduce the number of slivers though other algorithms may be used.

Figure 6:
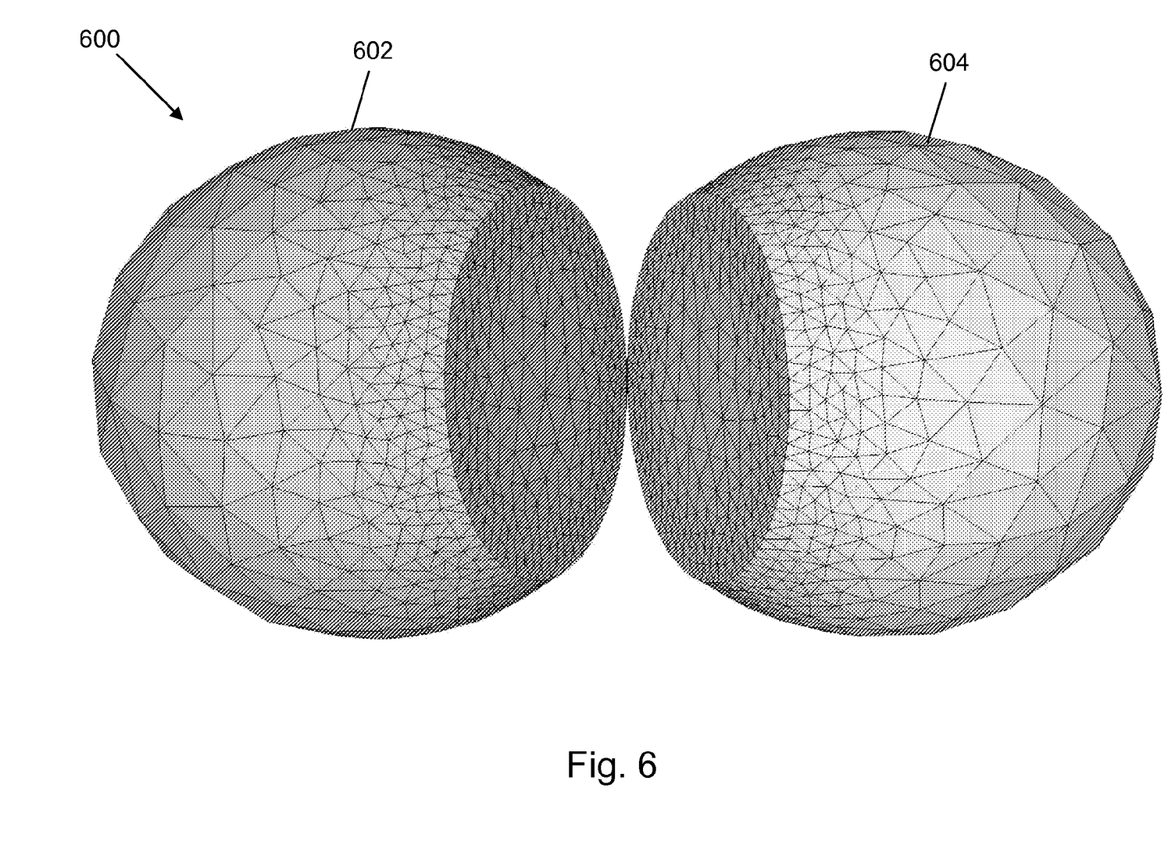
FIG. 6 depicts a mesh created using the multi-element meshing application of FIG. 2 for intersecting spheres formed of different elements in accordance with an exemplary embodiment.

With reference to FIG. 6, a 3-D object 600 is shown which includes a first volume 602 comprised of a first element and a second volume 604 comprised of a second element. 3-D object 600 was formed based on a synthetic dataset of two intersecting spheres having a volume dimension of 128×128× 128 using multi-element meshing application 112. 3-D object 600 illustrates the consistency of the surface meshes along the shared interface between first volume 602 and second volume 604 and the high quality of the meshes in efficiently capturing the geometry of the spheres and in adapting to the underlying geometry.

Figure 7:
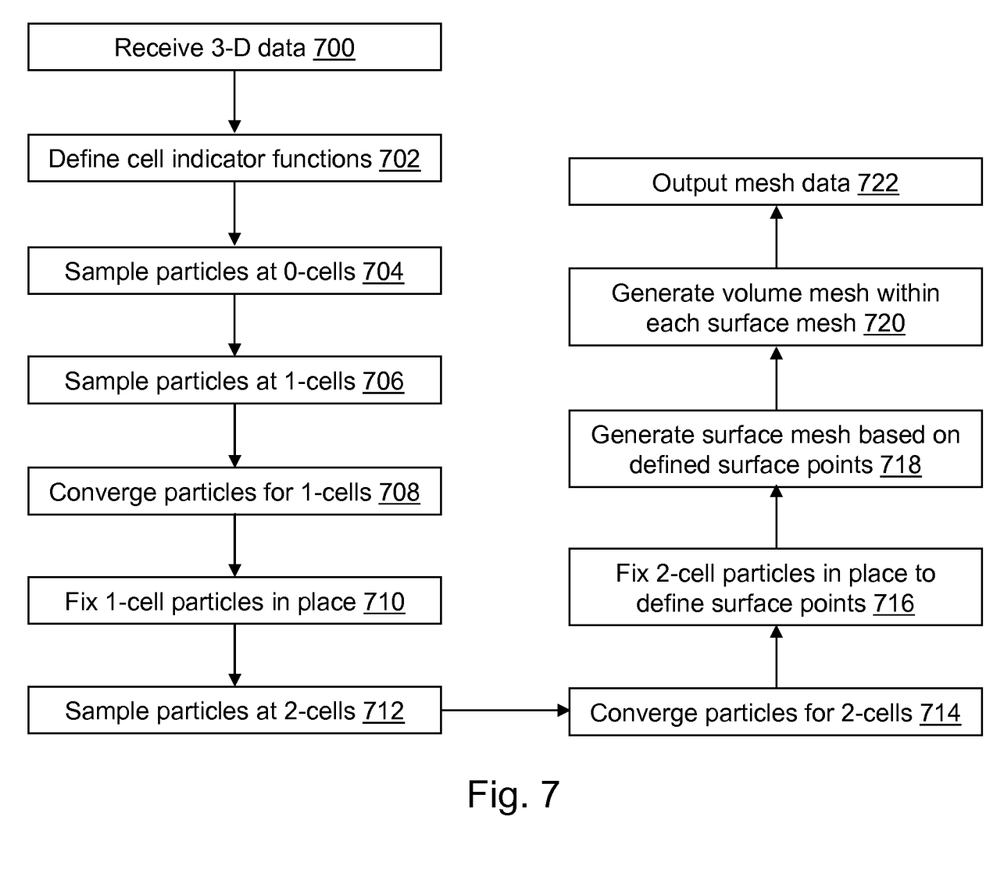
FIG. 7 depicts a flow diagram illustrating exemplary operations performed by a second multi-element meshing application of the 3-D mesh formation system of FIG. 1 in accordance with a second exemplary embodiment.

With reference to FIG. 7, exemplary operations associated with multi-element meshing application 112 are described in accordance with a second exemplary embodiment. As an example, multi-element meshing application 112 described in accordance with a second exemplary embodiment, may be particularly suited for forming a surface and/or volumetric mesh of 3-D data comprised of geometric model data. Additional, fewer, or different operations may be performed, depending on the embodiment. The order of presentation of the operations of FIG. 7 is not intended to be limiting. In an operation 700, 3-D data is received. In an operation 702, cell indicator functions are defined for each type of element interface identified based on the 3-D data. In an operation 704, the 0-cells (points) are sampled with a single particle, which remains fixed in place. In an operation 706, the 1-cells are sampled with particle systems that interact with the 0-cell particles. In an operation 708, the 1-cell particles are converged to a steady state.

In an operation 710, the 1-cell particles are fixed in place. In an operation 712, the 2-cells are sampled with particle systems that interact with the 0-cell and the 1-cell particles. In an operation 714, the 2-cell particles are converged to a steady state. In an operation 716, the 2-cell particles are fixed in place. The particles define surface points for each element surface. In an operation 718, a surface mesh is generated based on the set of surface points defined from the distributed particles. In an operation 720, a volumetric mesh is generated within each generated surface mesh. In an operation 722, the surface and/or volumetric mesh data is output. For example, the surface and/or volumetric mesh data may be presented to a user using output interface 102, may be stored to database 114 for input to a simulation or other process, or may be communicated to another device using communication interface 108 for further analysis, presentation, etc. As an example, in the case of parametric surface and curve models, the particle system may hierarchically sample intersections of trim curves (points), trim curves, discontinuities in surface normals, or joints between smooth surfaces, and then the parametric surface models.

The word "exemplary" is used herein to mean serving as an example, instance, or illustration. Any aspect or design described herein as "exemplary" is not necessarily to be construed as preferred or advantageous over other aspects or designs. Further, for the purposes of this disclosure and unless otherwise specified, "a" or "an" means "one or more". The exemplary embodiments may be implemented as a method, apparatus, or article of manufacture using standard programming and/or engineering techniques to produce software, firmware, hardware, or any combination thereof to control a computer to implement the disclosed embodiments.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The functionality described may be implemented in a single executable or application or may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system comprising:
   a processor; and
   a non-transitory computer-readable medium operably coupled to the processor and including computer-readable instructions stored therein, wherein, when executed by the processor, the computer-readable instructions cause the system to
      generate inside/outside (IO) functions based on indicator functions to identify element interfaces between a plurality of elements identified in three-dimensional (3-D) data, wherein an indicator function of the indicator functions is defined to represent a volume identified for an element of the plurality of elements identified in the 3-D data;
      define a cell indicator function for each element interface of the identified element interfaces based on the generated IO functions to identify a plurality of types of element interfaces, wherein the cell indicator function identifies points in the 3-D data where a plurality of the generated IO functions evaluate to approximately zero, and further wherein a type of element interface is identified based on a number of the generated IO functions that evaluate to approximately zero at a point in the 3-D data;
      distribute 3-D point locations on the identified element interfaces based on the identified plurality of types of element interfaces and the generated IO functions; and
      generate surface mesh data for the 3-D data based on the distributed 3-D point locations.

2. The system of claim 1, further comprising a data generator configured to generate the 3-D data.

3. The system of claim 2, further comprising a communication interface configured to receive the generated 3-D data from the data generator, wherein the processor is operably coupled to the communication interface.

4. The system of claim 1, further comprising an output interface configured to output the generated surface mesh data.

5. The system of claim 4, wherein outputting the generated surface mesh data comprises at least one of printing the generated surface mesh data, displaying the generated surface mesh data, storing a hyperlink to the generated surface mesh data in a memory, storing the generated surface mesh data in a memory, and sending the generated surface mesh data to a second device.

6. The system of claim 1, wherein the computer-readable instructions further cause the system to generate volumetric mesh data for the 3-D data based on the generated surface mesh data.

7. The system of claim 6, wherein the computer-readable instructions further cause the system to identify the plurality of elements in the 3-D data.

8. The system of claim 1, wherein the computer-readable instructions further cause the system to generate the indicator functions from the 3-D data based on the identified plurality of elements.

9. The system of claim 8, wherein the indicator function is generated using a grayscale morphology algorithm to define a tightened volume for each element as a signed distance to a surface of the element.

10. The system of claim 9, wherein the indicator function is a continuous, differentiable function reconstructed from the defined tightened volume using separable convolution.

11. The system of claim 10, wherein separable convolution convolves a one-dimensional, continuous kernel with grid points along each separate axis of the defined tightened volume.

12. The system of claim 1, wherein an IO function for the element of the plurality of elements identified in the 3-D data is defined as $$\tilde{f}_i = f_i - \max_{j=1, j \neq i}^{n} f_j$$

where $f_i$ is the indicator function for the element of the plurality of elements, n is the number of the plurality of elements, and $f_j$ is the indicator function for the $j^{th}$ element of the plurality of elements.

13. The system of claim 1, wherein the cell indicator function for each element interface of the identified element interfaces is defined as $$J_m = \sum_{i \in M} \tilde{f}_i^2$$

where M is a set of elements of the plurality of elements whose generated IO functions evaluate to approximately zero at a point in the 3-D data and $\tilde{f}_i$ is the IO function for each element of the set of elements.

14. The system of claim 1, wherein distributing the 3-D point locations on the identified element interfaces comprises:
   positioning a first particle indicator at each point defining a first interface of four elements based on the cell indicator functions;
   positioning a second particle indicator defining a second interface of three elements based on the cell indicator functions;
   converging the second particle indicator positions to a first steady state using a first motion vector defined for each second particle indicator position based on the generated IO functions;
   positioning a third particle indicator defining a third interface of two elements based on the cell indicator functions; and
   converging the third particle indicator positions to a second steady state using a second motion vector defined for each third particle indicator position based on the generated IO functions, wherein the first particle indicator positions, the converged second particle indicator positions, and the converged third particle indicator positions define the 3-D point locations.

15. The system of claim 14, wherein the second motion vector defined for each third particle indicator position is projected onto a tangent plane defined by $$n_t = \frac{\nabla \tilde{f}_i - \nabla \tilde{f}_j}{|\nabla \tilde{f}_i - \nabla \tilde{f}_j|}$$

where $\tilde{f}_i$ is the IO function for a first element of the two elements and $\tilde{f}_j$ is the IO function for a second element of the two elements.

16. The system of claim 15, wherein the second motion vector is updated as $v \leftarrow v - \langle v, n_t \rangle n_t = (I - n_t \otimes n_t)v$ where v is the second motion vector and I is an identity vector.

17. The system of claim 14, wherein the first motion vector is defined by $$v \leftarrow \left\langle \frac{t_{ijk}}{|t_{ijk}|}, v \right\rangle \frac{t_{ijk}}{|t_{ijk}|}$$

where v is the first motion vector, $$t_{ijk} = \frac{\nabla \tilde{f}_i}{|\nabla \tilde{f}_i|} \times \frac{\nabla \tilde{f}_j}{|\nabla \tilde{f}_j|} + \frac{\nabla \tilde{f}_j}{|\nabla \tilde{f}_j|} \times \frac{\nabla \tilde{f}_k}{|\nabla \tilde{f}_k|} + \frac{\nabla \tilde{f}_k}{|\nabla \tilde{f}_k|} \times \frac{\nabla \tilde{f}_i}{|\nabla \tilde{f}_i|},$$

$\tilde{f}_i$ is the IO function for a first element of the three elements, $\tilde{f}_j$ is the IO function for a second element of the three elements, and $\tilde{f}_k$ is the IO function for a third element of the three elements.

18. The system of claim 14, wherein the second particle indicator positions are converged to the first steady state using an iterative algorithm that relaxes the second particle indicator positions to minimize an energy function that favors an equal distribution of points.

19. A method of forming mesh data for three-dimensional data, the method comprising:
generating, by a computing device, inside/outside (IO) functions based on indicator functions to identify element interfaces between a plurality of elements identified in three-dimensional (3-D) data, wherein an indicator function of the indicator functions is defined to represent a volume identified for an element of the plurality of elements identified in the 3-D data;
defining, by a computing device, a cell indicator function for each element interface of the identified element interfaces based on the generated IO functions to identify a plurality of types of element interfaces, wherein the cell indicator function identifies points in the 3-D data where a plurality of the generated IO functions evaluate to approximately zero, and further wherein a type of element interface is identified based on a number of the generated IO functions that evaluate to approximately zero at a point in the 3-D data;
distributing, by a computing device, 3-D point locations on the identified element interfaces based on the identified plurality of types of element interfaces and the generated IO functions; and
generating, by a computing device, surface mesh data for the 3-D data based on the distributed 3-D point locations.

20. A non-transitory computer-readable medium including computer-readable instructions stored therein, wherein, when executed by a processor, the computer-readable instructions cause a computing device to:
generate inside/outside (IO) functions based on indicator functions to identify element interfaces between a plurality of elements identified in three-dimensional (3-D) data, wherein an indicator function of the indicator functions is defined to represent a volume identified for an element of the plurality of elements identified in the 3-D data;
define a cell indicator function for each element interface of the identified element interfaces based on the generated IO functions to identify a plurality of types of element interfaces, wherein the cell indicator function identifies points in the 3-D data where a plurality of the generated IO functions evaluate to approximately zero, and further wherein a type of element interface is identified based on a number of the generated IO functions that evaluate to approximately zero at a point in the 3-D data;
distribute 3-D point locations on the identified element interfaces based on the identified plurality of types of element interfaces and the generated IO functions; and
generate surface mesh data for the 3-D data based on the distributed 3-D point locations.

\* \* \* \* \*

UNITED STATES PATENT AND TRADEMARK OFFICE
CERTIFICATE OF CORRECTION

| | | |
|---|---|---|
| PATENT NO. | : 8,525,832 B2 | Page 1 of 1 |
| APPLICATION NO. | : 13/123347 | |
| DATED | : September 3, 2013 | |
| INVENTOR(S) | : Ross T. Whitaker | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 338 days.

Signed and Sealed this
Twenty-ninth Day of October, 2013

Teresa Stanek Rea
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,525,832 B2 | Page 1 of 1 |
| APPLICATION NO. | : 13/123347 | |
| DATED | : September 3, 2013 | |
| INVENTOR(S) | : Whitaker et al. | |

It is certified that error appears in the above-identified patent and that said Letters Patent is hereby corrected as shown below:

IN THE CLAIMS

Col. 13; line 26 (claim 1)

Delete the phrase "10 functions evaluate" and replace with the phrase --IO functions evaluate--

Col. 13; line 29 (claim 1)

Delete the phrase "10 functions that evaluate" and replace with the phrase --IO functions that evaluate--

Signed and Sealed this
Twenty-fourth Day of June, 2014

Michelle K. Lee
*Deputy Director of the United States Patent and Trademark Office*